(No Model.)
C. W. & J. W. SPARKS.
VEGETABLE DRAINER.
No. 419,729. Patented Jan. 21, 1890.
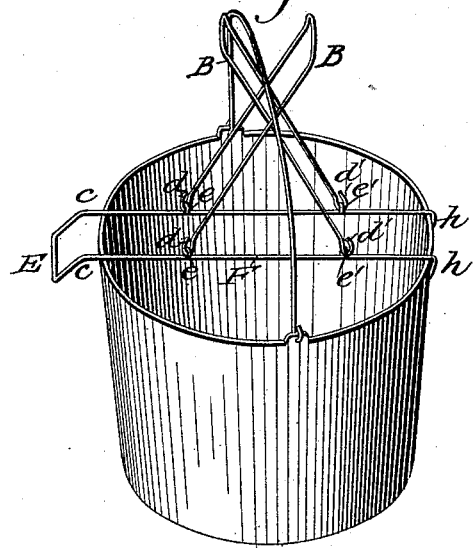
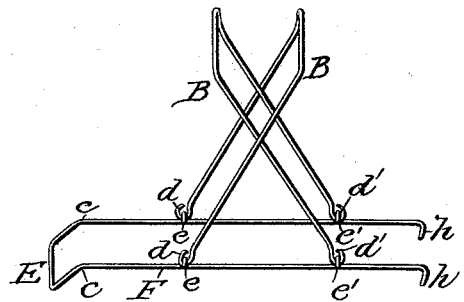
Witnesses
Henry Nihart
Joseph E. Brown
Inventor
Charles W. Sparks
John W. Sparks

UNITED STATES PATENT OFFICE.

CHARLES W. SPARKS AND JOHN W. SPARKS, OF MYRTLE, (DAKOTA TERRITORY,) SOUTH DAKOTA.

VEGETABLE-DRAINER.

SPECIFICATION forming part of Letters Patent No. 419,729, dated January 21, 1890.

Application filed April 19, 1889. Serial No. 307,893. (No model.)

*To all whom it may concern:*

Be it known that we, CHARLES W. SPARKS and JOHN W. SPARKS, citizens of the United States, residing at Myrtle, in the county of Bon Homme and Territory of Dakota, have invented a new and useful Vegetable-Drainer, of which the following is a specification.

Our invention relates to improvements in vegetable-drainers in which a combination of wires operates in conjunction with a kettle; and the objects of our improvements are, first, to firmly hold the cover of the kettle in place while vegetables are being drained; second, to afford facilities for the proper adjustment of the drainer to the different heights of kettle-bails, and third, to protect the hands from being burned while in operation. We attain these objects by the mechanism illustrated in the accompanying drawings, in which—

Figure 1 is a perspective view of the entire device. Fig. 2 is a detail view of the device as it appears placed on the kettle ready for operation.

Like letters refer to corresponding parts in each view.

The operation of this invention is obvious, while the means employed are simple.

The main wire F, having coils forming eyes $e\ e\ e'\ e'$, with hooks $h\ h$ and handle E, constitutes the frame-work of the device. To the main wire F are connected bails B B, by means of hooks $d\ d\ d'\ d'$, passing through eyes $e\ e\ e'\ e'$. The bails are so constructed that one swings inside of the other and when in operation forms a cross. (See Fig. 1.) The upper part of bails B B, when brought toward each other with the kettle-handle between them, as shown in Fig. 1, produces a pressure on main wire F, firmly holding the kettle-cover in place. This effect is produced with one hand, while the other hand operates the handle E by lifting on it, and thus draws the hooks $h\ h$ against the kettle, causing it to tilt. Curves $c\ c$ are made in the main wire F, which throws the handle E below the rim of the kettle, thereby protecting the hand from escaping steam when in operation.

What we claim as our invention, and desire to secure by Letters Patent, is—

The combination, in a vegetable-drainer, of the main wire F, having hooks $h\ h$ and eyes $e\ e\ e'\ e'$, with bails B B, having hooks $d\ d\ d'\ d'$ communicating with the said eyes, all substantially as set forth.

CHARLES W. SPARKS.
JOHN W. SPARKS.

Witnesses:
JULIUS O. SMITH,
JAMES W. STURTEVANT.